May 4, 1937.  G. J. PARKS  2,079,302
STUFFING BOX
Filed June 13, 1935   3 Sheets—Sheet 1

Inventor
G. J. Parks
By Clarence A. O'Brien
Attorney

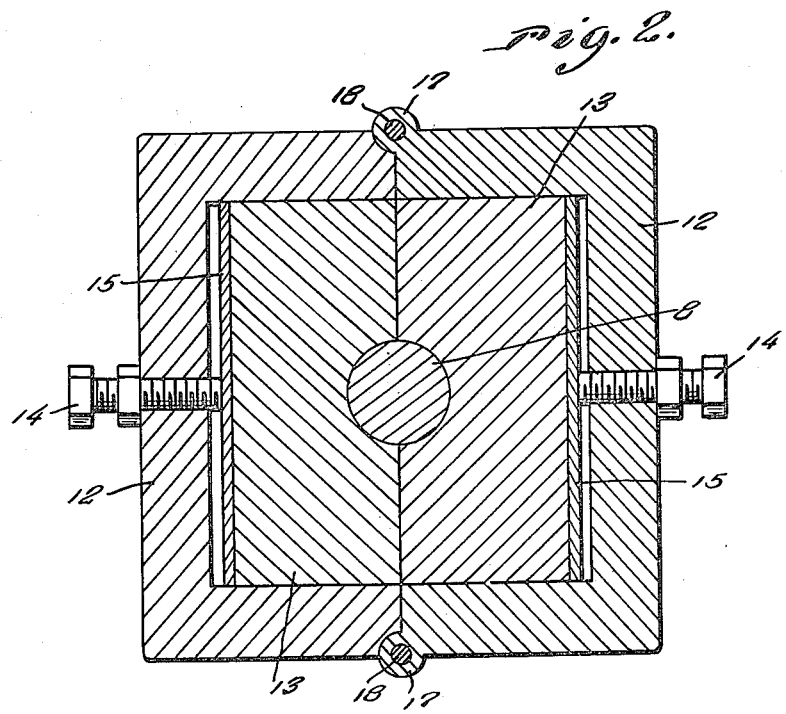
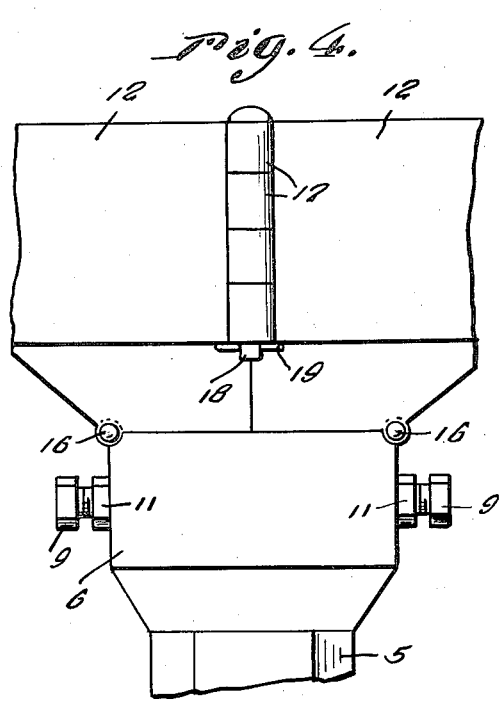
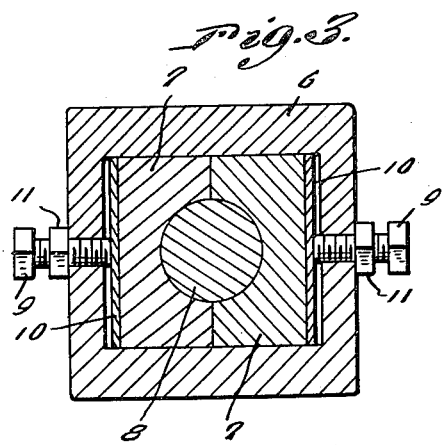

Patented May 4, 1937

2,079,302

UNITED STATES PATENT OFFICE 2,079,302

STUFFING BOX

George J. Parks, Rixford, Pa.

Application June 13, 1935, Serial No. 26,449

3 Claims. (Cl. 286—16)

This invention relates to stuffing boxes and has as its object the provision of an improved stuffing box especially adapted for use in connection with oil well pumping rods.

An object of the present invention is to provide a stuffing box characterized by improved construction to the end that a block-type of packing may be employed, a feature desirable in that such a type of packing in actual practice has proved more efficient than the ordinary ring packing now generally used.

Further, in accordance with the present invention the stuffing box is provided with an auxiliary stuffing box for use when the main stuffing box is being repacked.

Further, an object of the present invention is to provide a stuffing box which will cut down replacement cost.

A further object of the invention is to provide a stuffing box of such construction that the packing may be readily and easily placed therein as distinguished from the forcing of the packing by tools into the box as generally required and in most instances results in damage to the packing thus impairing greatly the efficiency of the stuffing box.

A further object of the invention is to provide a stuffing box which will permit a repacking thereof without the necessity of shutting down the well, the shutting down of the well being undesirable for any one of a number of reasons known to those skilled in the art.

The invention together with its objects and advantages will be best understood from a study of the following description taken in connection with the accompanying drawings wherein:

Figure 1 is a longitudinal sectional view through the stuffing box and also through a coupling sleeve embodying the features of the present invention.

Figures 2 and 3 are sectional views taken substantially on the lines 2—2 and 3—3 respectively of Figure 1.

Figure 4 is a fragmentary elevational view of the stuffing box.

Figure 1:
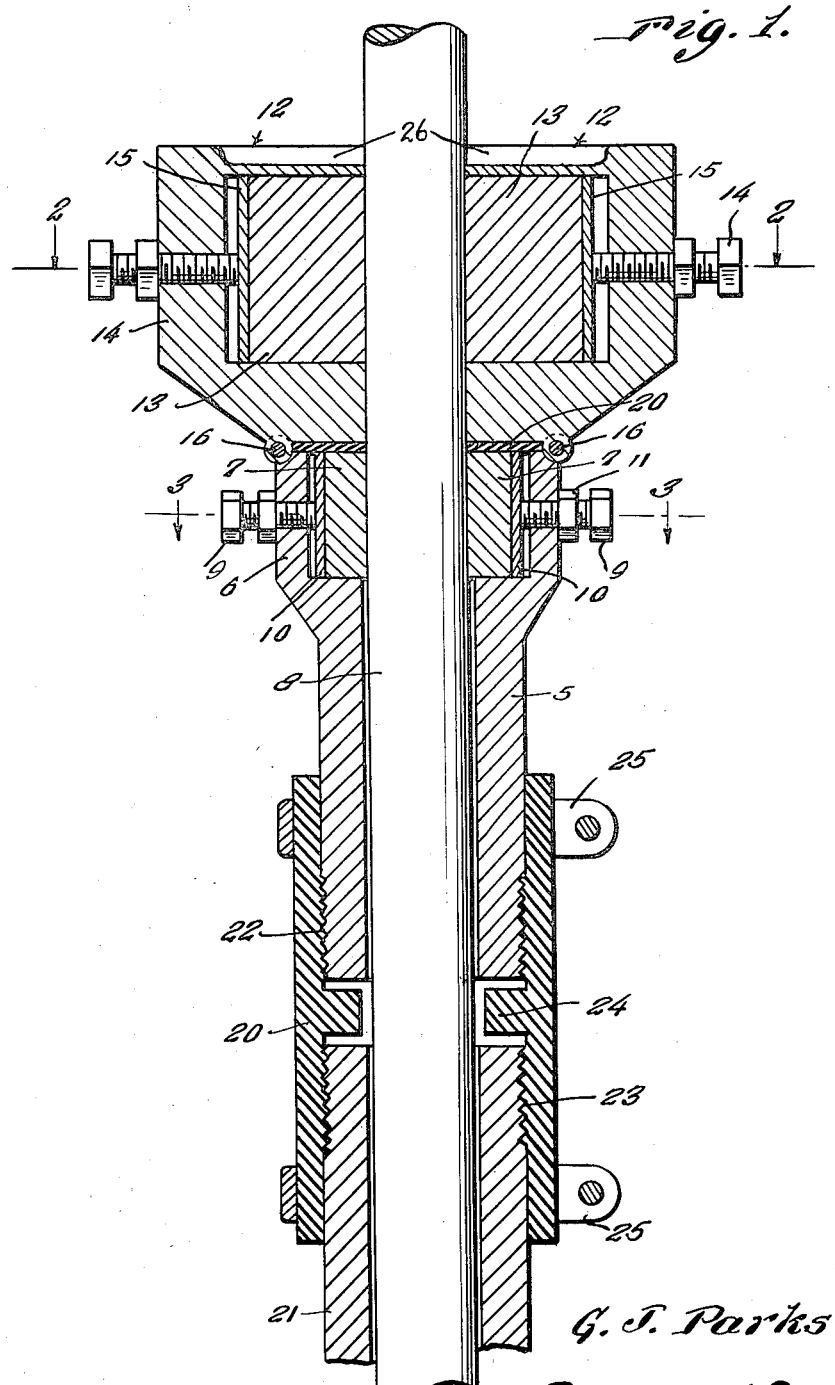

Referring to the drawings by reference numerals it will be seen that the stuffing box comprises a substantially tubular body 5 formed at its upper end with an enlarged integral head 6 hollowed out to provide internally a rectangular auxiliary stuffing box adapted to receive a pair of cooperating metallic packing elements 7, the packing elements 7 are of block form as shown in Figure 3 and have their meeting edges suitably notched to accommodate therebetween the polish rod 8 as best shown in Figure 3.

For adjusting the packing blocks 7, there are provided adjustment screws 9 threaded into the box 6 at opposite sides thereof and adapted to engage wear plates 10 provided at the sides of the packing blocks 7 remote from the meeting faces of the blocks. As shown, the screws 9 are also provided with lock nuts 11 for an obvious purpose.

Above the auxiliary stuffing box 6 is a larger and main stuffing box. This latter box comprises a pair of complemental half sections 12—12 which are of substantially hollow form being open only at the meeting edges thereof, at which edges the top and bottom of the sections 12 are provided with semi-circular notches so as to accommodate the polish rod 8. Arranged within the sections 12 of the main stuffing box are packing blocks 13 similar to but larger in size than the blocks 7. For adjusting the blocks 13 there are also provided adjusting screws 14 threadedly engaged with the outer sides of the sections 12 and having inner ends bearing against wear plates 15 provided as shown for the blocks 13.

The main stuffing box sections 12 are hinged to the upper edge of the box 6 as at 16, and at opposite ends thereof, and adjacent their meeting edges, sections 12 of the main stuffing box are provided with aligned sleeves 17 for receiving hinge or locking pins 18 equipped with cotter pins 19 all of which is best shown in Figures 2 and 4.

Also, between the boxes 6 and 12 there is clamped a packing gland 20 of any suitable material and as shown in Figure 1.

It will be understood that in actual practice, the auxiliary stuffing box 6 and packings 7 need be used only when the main stuffing box 12—12 is being repacked, that is to say, when the packing 13 is being replaced.

It will be also noted that in the case of both stuffing boxes the packing blocks fit easily therein and consequently resort need not be had to tools for forcing the packing into their respective packing boxes as is now generally required.

It will also be noted that to replace the packing 13, all that is necessary is to withdraw the pins 18 whereupon the sections 12 may be swung away from one another about their respective hinges 16 to the end that access may be easily had to the packing 13 for replacing the latter.

Also, in accordance with the present invention, there is provided an elastic coupling sleeve 20 for use, as clearly shown in Figure 1 in connecting the body 5 of the stuffing box with the usual nipple 21. The sleeve 20 is adapted to embrace the confronting spaced ends of the body 5 and the nipple 21 and is internally provided with threads for cooperation with the threads on the body 5 and the nipple 21, and as indicated generally at 22 and 23. The sleeve 20 intermediate its ends is formed internally with an integral flange 24 that fits in the space between the adjacent ends of the body 5 and the nipple 21. For securing the sleeve about the body 5 and the nipple 21 suitable split clamps 25 or the like may be resorted to.

Figure 5:
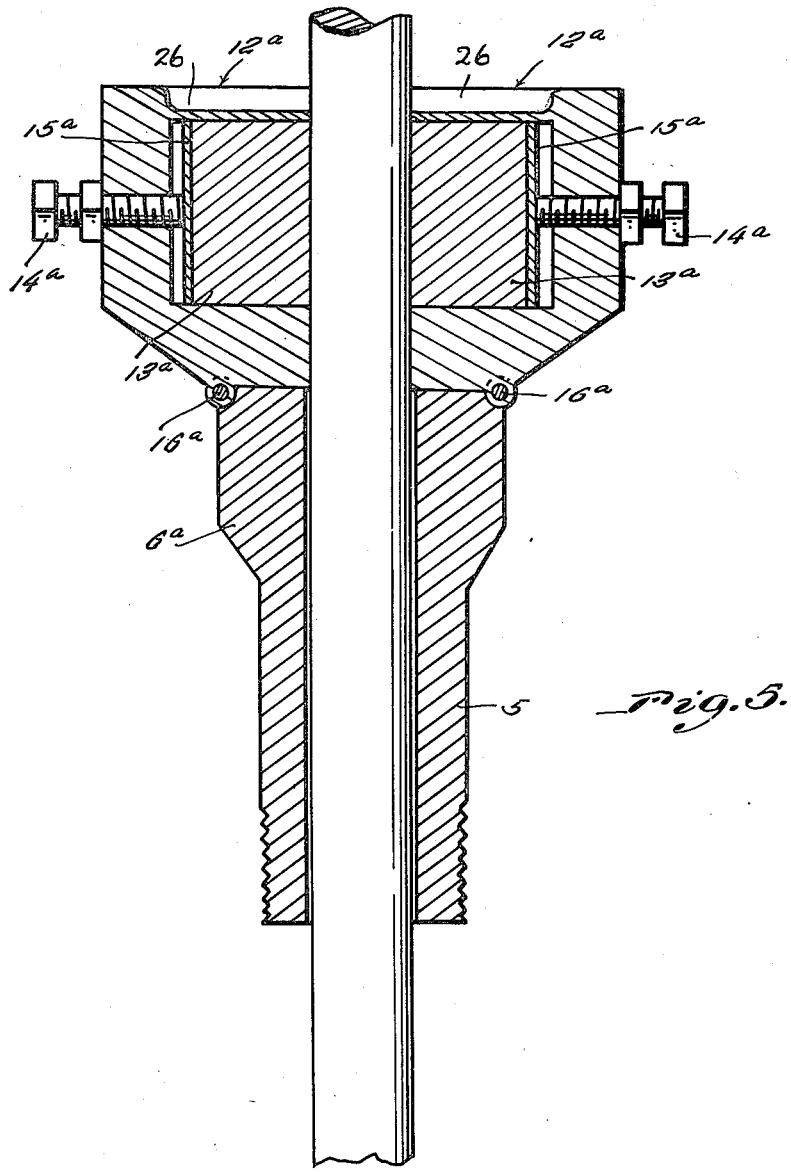
Figure 5 is a view similar to Figure 1 illustrating a slightly modified form of the invention.

In Figure 5 a slightly modified form of the invention is illustrated. In this form of the invention the aforementioned auxiliary stuffing box and associated packing is eliminated. Thus in this form of the invention the body of the stuffing box indicated by the reference numeral 5a has its enlarged end 6a solid as shown, and directly hinged to this end of the body as at 16a—16a are the complemental sections 12a of the stuffing box. These sections as in the first form of the invention accommodate packing blocks 13a equipped with wear plates 15a. Also, adjusting screws 14a are provided, and as apparent, with the exception of the auxiliary stuffing box, this modified form of the invention is identical with the first form described in detail.

In Figure 5 the application of the improved stuffing box is also shown without the sleeve 20 since obviously, this sleeve may or may not be used as occasion may require.

It may be also herein stated that in both forms of the invention, if desired, there may be built into the top portion of the sections 12—12 or 12a—12a as the case may be suitable means for oil lubrication, such as for example the oil reservoir 26.

Having thus described the invention, what is claimed as new is:

1. In a stuffing box for oil well pumping rods, an elongated body member having an axial opening therethrough adapted to receive a well pumping rod, said body having an enlargement at one end, complemental, hollow shell-like stuffing box sections respectively hinged to the enlarged end of said body member, each of said sections being opened on one side only and said sections at the open sides thereof having circular notches in their top and bottom walls for accommodating the well pumping rod, packing blocks slidably fitting within the hollows of said sections, and adjusting screws threaded through the outer walls of said sections and having inner ends for bearing engagement against said packing blocks for moving the latter into engagement with a well pumping rod.

2. In a stuffing box for oil well pumping rods, a relatively small auxiliary stuffing box open entirely at its top side, a relatively large stuffing box, said large stuffing box comprising a pair of complemental hollow sections open at their meeting sides only and respectively hingedly connected to opposed sides of the auxiliary stuffing box, said main stuffing box sections having bottom walls cooperating to provide a closure for the top of the auxiliary stuffing box, and packing blocks slidably arranged in the auxiliary stuffing box and in the sections of the main stuffing box respectively, and means engaged with each packing block for moving opposed packing blocks toward one another.

3. In a stuffing box for oil well pumping rods, a relatively small auxiliary stuffing box open entirely at its top side, a relatively large stuffing box, said large stuffing box comprising a pair of complemental hollow sections open at their meeting sides only and respectively hingedly connected to opposed sides of the auxiliary stuffing box, said main stuffing box sections having bottom walls cooperating to provide a closure for the top of the auxiliary stuffing box, and packing blocks slidably arranged in the auxiliary stuffing box and in the sections of the main stuffing box respectively, and means engaged with each packing block for moving opposed packing blocks toward one another, and each of the sections of the main stuffing box also having a top wall provided with a lubricant well.

GEORGE J. PARKS.